US007310327B2

(12) United States Patent
Fehr

(10) Patent No.: US 7,310,327 B2
(45) Date of Patent: Dec. 18, 2007

(54) METHOD AND APPARATUS FOR TIME SYNCHRONIZING AN IN-VEHICLE NETWORK

(75) Inventor: Walton L. Fehr, Mundelein, IL (US)

(73) Assignee: Temic Automotive of North America, Inc., Deer Park, IL (US)

(*) Notice: Subject to any disclaimer, the term of this patent is extended or adjusted under 35 U.S.C. 154(b) by 1005 days.

(21) Appl. No.: 10/424,644

(22) Filed: Apr. 28, 2003

(65) Prior Publication Data

US 2004/0213295 A1 Oct. 28, 2004

(51) Int. Cl.
*H04J 3/06* (2006.01)
*H04B 7/212* (2006.01)
*H04B 7/19* (2006.01)

(52) U.S. Cl. ...................... 370/350; 370/324; 370/503; 455/13.2

(58) Field of Classification Search ................ 370/324, 370/350, 503–520; 455/456.1–457, 13.2, 455/502, 402, 13.4, 270
See application file for complete search history.

(56) References Cited

U.S. PATENT DOCUMENTS 5,893,044 A * 4/1999 King et al. ................ 701/214
6,449,485 B1 * 9/2002 Anzil ...................... 455/456.1
6,704,547 B2 * 3/2004 Kuwahara et al. ....... 455/67.16
6,882,912 B2 * 4/2005 DiLodovico et al. ......... 701/35
7,190,946 B2 * 3/2007 Mazzara et al. ......... 455/404.1

OTHER PUBLICATIONS

Elson et al., Fine-Grained Network Time Synchronization using Reference Broadcasts, May 17, 2002, University of California, Department of Computer Science, pp. 1-14.*

* cited by examiner

*Primary Examiner*—Chi Pham
*Assistant Examiner*—Tri H. Phan

(57) ABSTRACT

An independent, broadcast medium (32) is used to communicate an time reference to each element: switch element (36), active element (14-20) or passive element, of an in-vehicle network (30). Each element (36) in the network accepts the time information, i.e., a time reference from the source. The time reference is then used by each element (36) to adjust an internal clock of the element. Commands may then be sent to the elements to occur at a particular time.

18 Claims, 3 Drawing Sheets

METHOD AND APPARATUS FOR TIME SYNCHRONIZING AN IN-VEHICLE NETWORK

TECHNICAL FIELD

This patent relates generally to in-vehicle communication networks and particularly to a method and apparatus for synchronizing nodes in an in-vehicle network.

BACKGROUND

The commonly assigned U.S. patent application entitled "Vehicle Active Network," Ser. No. 09/945,581, filed Aug. 31, 2002, the disclosure of which is hereby expressly incorporated herein by reference, introduces the concept of an active network that includes a switch fabric. The switch fabric is a web of interconnected switching devices. Control devices, sensors, actuators and the like are coupled to the switch fabric, and the switch fabric facilitates communication between these coupled devices.

The coupled devices may be indicator lights, vehicle control systems, vehicle safety systems, and comfort and convenience systems. A command to actuate a device or devices may be generated by a control element coupled to the switch fabric and is communicated to the device or devices via the switch fabric. The command may require simultaneous activation of two or more devices. However, the switch fabric may be a packet based communication medium making coordinating simultaneous events difficult.

To illustrate this difficulty take for example the need to illuminate the left, right and center high-mounted brake lights on an automobile. Each of the brake lights should appear to illuminate substantially simultaneously. Each of the lights is coupled to the switch fabric. The command to illuminate the lights may be generated by a braking control module, which is also coupled to the switch fabric. The command is communicated from the braking control module to the three brake lights. However, the command may take different incremental amounts of time based upon the paths the command takes through the network to arrive at each of the three brake lights. If the brake lights act on the command when received, the lights may not appear to come on simultaneously. The command may give a time at which to activate, but if each of the brake lights are not time synchronized, they still will not actuate at the same coordinated time.

Another problem may involve the communication of information from many devices to a single device. For example, it may be necessary to communicate various control parameters from a number of engine sensors to an engine controller so that it may then issue commands for the control of the engine. For example, to detect misfire the engine controller receives data from several oxygen sensors, the crankshaft position sensor and potentially other sensors. To be certain that the misfire is detected for the correct engine cylinder so that control parameters may be varied to correct the misfire, the data must arrive to the engine controller in a coordinated manner or have a reliable time indication. Again, unless each of the sensors are time synchronized, there is no way to accurately time stamp the data packets or to effectively communicate them to the engine controller in a coordinated manner.

Thus, there is a need for a method and apparatus to synchronize elements of an in-vehicle network.

BRIEF DESCRIPTION OF THE DRAWINGS

This disclosure will describe several embodiments to illustrate its broad teachings. Reference is also made to the attached drawings.

DETAILED DESCRIPTION

An broadcast medium independent of the primary communication medium (switch fabric) is used to communicate a time reference to each element: switch element, active element or passive element, of an in-vehicle network. Each element in the network accepts the time information, i.e., a time reference from the source. The time reference is then used by each element to adjust an internal clock of the element. Commands may then be sent to the elements to occur at a time. Data communicated by many devices to a single device may be given a reliable time stamp.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
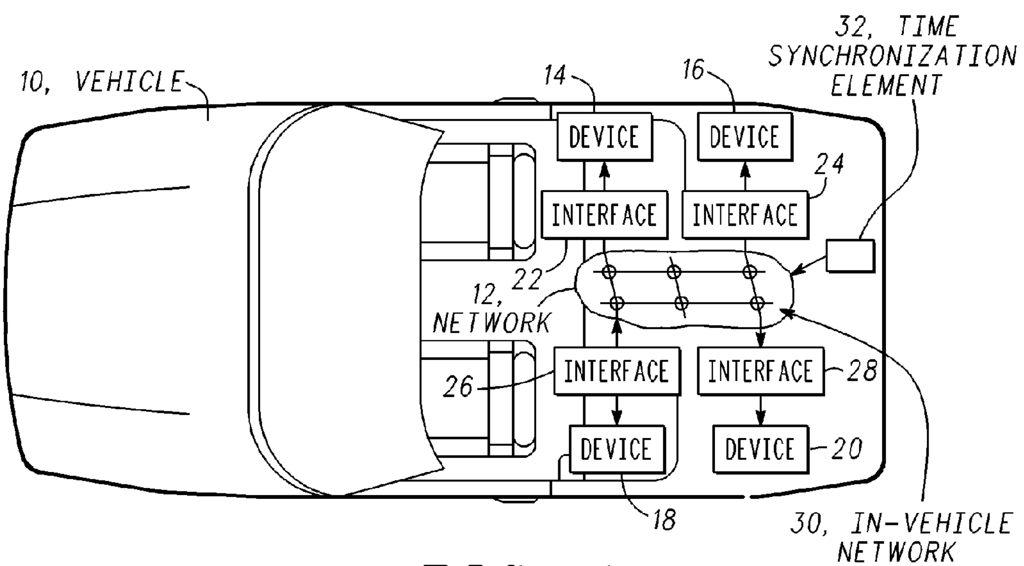
FIG. 1 is a schematic representation of a vehicle network incorporating synchronization.

FIG. 1 illustrates a vehicle 10 including a network 12 to which various vehicle devices 14-20 are coupled via respective interfaces 22-28. The devices may be sensors, actuators and processors used in connection with various vehicle functional systems and sub-systems, such as, but not limited to, control-by-wire applications for throttle, braking and steering control, adaptive suspension, power accessory control, communications, entertainment, and the like.

The interfaces 22-28 are any suitable interface for coupling the particular device to the network 12, and may be wire, optical, wireless or combinations thereof. The interfaced device is particularly adapted to provide one or more functions associated with the vehicle. These devices may be data producing, such as a sensor, data consuming, such as an actuator, or processing, which both produces and consumes data. Of course, an actuator, typically a data-consuming device, may also produce data, for example where the actuator produces data indicating it has achieved the instructed state, or a sensor may consume data, for example, where it is provided instructions for the manner of function. Data produced by or provided to a device, and carried by the network 12, is independent of the function of the device itself. That is, the interfaces 22-28 provide device independent data exchange between the coupled device and the network 12.

The network 12 may include a switch fabric 30 defining a plurality of communication paths between the devices. The communication paths permit multiple simultaneous peer-to-peer, one-to-many, many-to-many, etc. communications between the devices 14-20. During operation of the vehicle 10, data exchanged, for example, between devices 14 and 20 may utilize any available path or paths between the devices. In operation, a single path through the switch fabric 30 may carry all of a single data communication between the device 14 and the device 20, or several communication paths may carry portions of the data communication. Subsequent communications may use the same path or other paths as dictated by the then state of the network 12. This provides reliability and speed advantages over bus architectures that provide single communication paths between devices, and hence are subject to failure with failure of the single path. Moreover, communications between other of the devices 14-20 may occur simultaneously using the communication paths within the switch fabric 30.

The network 12 may comply with transmission control protocol/Internet (TCP/IP), asynchronous transfer mode (ATM), Infiniband, RapidIO, or other packet data protocols. As such, the network 12 utilizes data packets, having fixed or variable length, defined by the applicable protocol. For example, if the network 12 uses asynchronous transfer mode (ATM) communication protocol, ATM standard data cells are used.

The devices 14-20 need not be discrete devices. Instead, the devices may be systems or subsystems of the vehicle and may include one or more legacy communication media, i.e., legacy bus architectures such as CAN, LIN, FLEXRAY or similar bus structures. In such embodiments, the respective interface 22-28 may be configured as a proxy or gateway to permit communication between the network 12 and the legacy device 14-20.

Some applications may require synchronized activity between multiple elements of the network or devices connected to the network. This synchronized activity requires timing information be available within the network 12. As shown in FIG. 1, a time synchronization element 32 is coupled to the network 12. While shown as a separate element for illustration, the time synchronization element 32 may be incorporated within a node of the switch fabric 30, one of the devices 14-20, one of the interfaces 22-28 or any other appropriate element of the network 12.

Each element of the network 12 including the devices 14-20 and the interfaces 22-28 may substantially simultaneously "see" the time synchronization element 32 as illustrated by the cloud surrounding the network 12. For example, each node of the switch fabric 30, each of the devices 14-20 and interfaces 22-28 are coupled to receive power via respective power feeds (not depicted). The time synchronization element 32 may be adapted to provide a signal on the power feeds, which is received substantially simultaneously be each element of the network as well as each of the coupled devices 14-20 and interfaces 22-28. In this manner a signal may be provided throughout the network, devices and interfaces via a medium independent of the network itself for time synchronization. The signal may be as simple as an edge of a power spike or drop that is detected by each network element, device and interface and used to reset an associated internal clock. Alternatively, the signal may provide modulated information on the power feeds that is detected and decoded by the elements, devices and interfaces and used for time synchronization. The signal may be sent via any media that permits it to be substantially simultaneously received by all of the devices within the vehicle. Further alternative media include radio-frequency, magnetic, optical, haptic (e.g., vibration) and the like types of transmission are contemplated.

Figure 2:
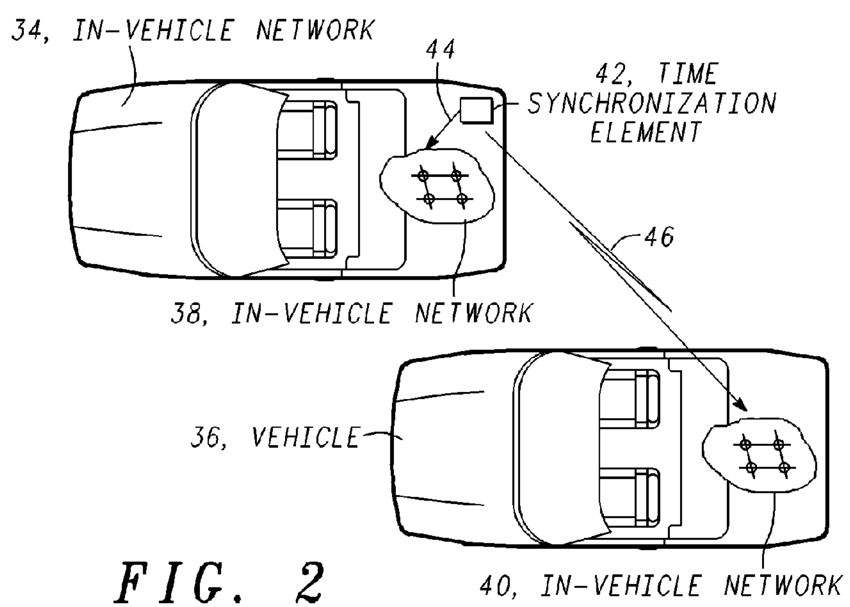
FIG. 2 is a schematic representation of synchronization of networks in two vehicles.

FIG. 2 illustrates two vehicles 34 and 36 traveling together. There may be more than two vehicles, but two are illustrative. Each of the vehicles 34 and 36 incorporate networks 38 and 40, respectively, that may include a plurality of network elements communicatively coupling devices, interfaces and the like. Either or both of the vehicles 34 and 36, only vehicle 34 being so depicted in FIG. 2, may further include a time synchronization element 42 for sending timing signals 44 and 46 substantially simultaneously to each of the networks 38 and 40. Within the vehicle 34, the signal 44 may be communicated by way of the power distribution network or may be a wireless transmission received by each network element, device and interface. The signal 46 is communicated wirelessly from the vehicle 34 to the vehicle 36. Within the vehicle 36, the signal 46 may cause substantially simultaneously synchronization of the network 40 and all coupled devices and interfaces via the power distribution network or the signal may be received by each network element, device and interface. In this manner, both vehicles 34 and 36 may operate based upon a common time reference for such tasks as collision avoidance, inter-vehicle communication and data sharing.

Figure 3:
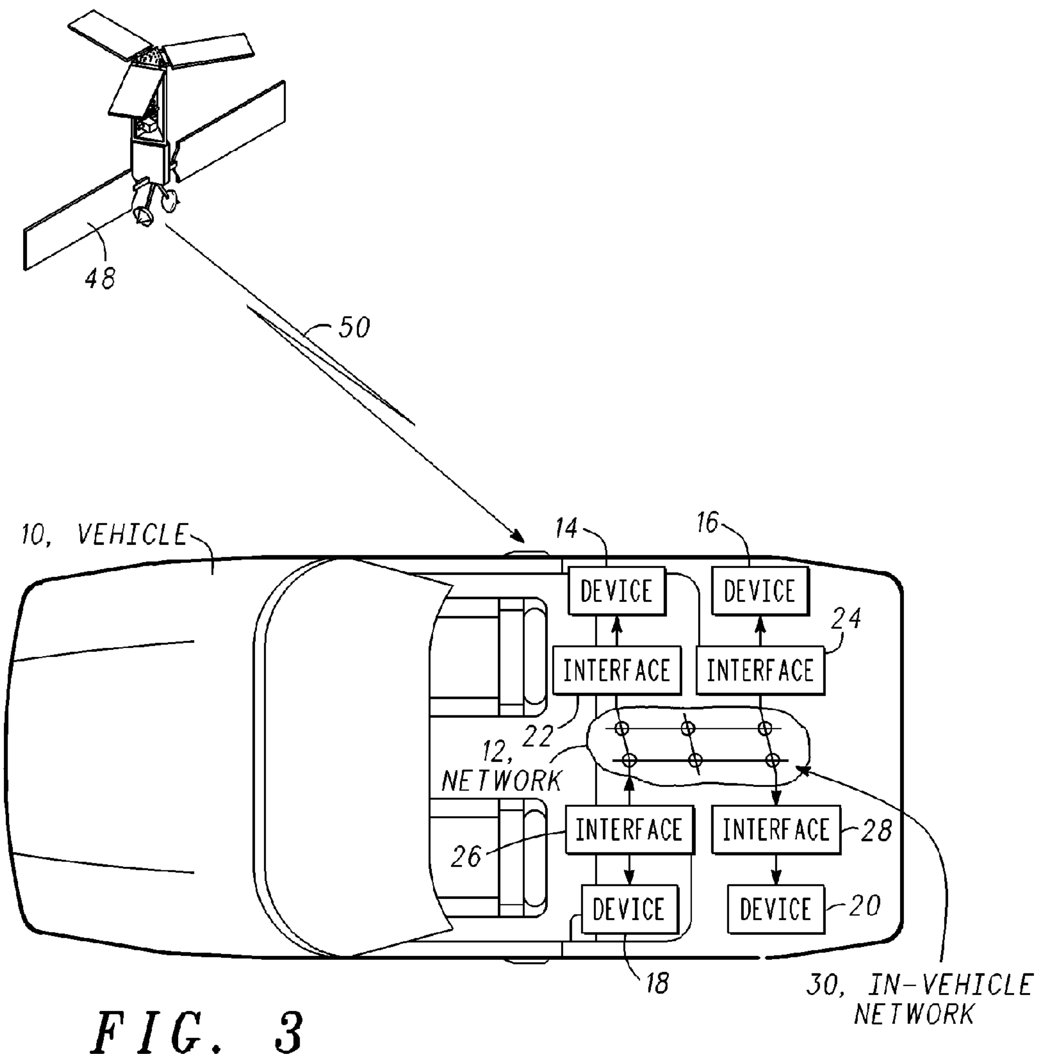
FIG. 3 is a schematic representation of a vehicle network incorporating synchronization.

It may be necessary for a vehicle to have a truly universal time reference. In FIG. 3, an outside media source 48 provides a timing signal 50 via wireless transmission to the network 12 of the vehicle 10. As shown in FIG. 3, the timing signal 50 may be provided by the global positioning system (GPS) or by another space-based satellite system. Alternatively, the timing signal may be a WWV broadcast timing signal, timing signals broadcast by cellular telephone base station equipment, or other sources external to the network 12 capable of providing the timing signal 50.

Each of the nodes of the switch fabric 30 receives the timing signal 50 and processes the signal in order to derive a time reference. The time reference is then stored within the nodes. Additionally, each of the devices 14-20 receives the timing signal and likewise determines the time reference and stores the time reference. Thus, all of the elements of the network 12 as well as the connected devices 14-20 have a common, absolute time reference. The common time reference may by used to time stamp data that is sent to other elements of the network or devices coupled thereto, or may be used to coordinate activity such as when devices need to be substantially simultaneously activated.

Figure 4:
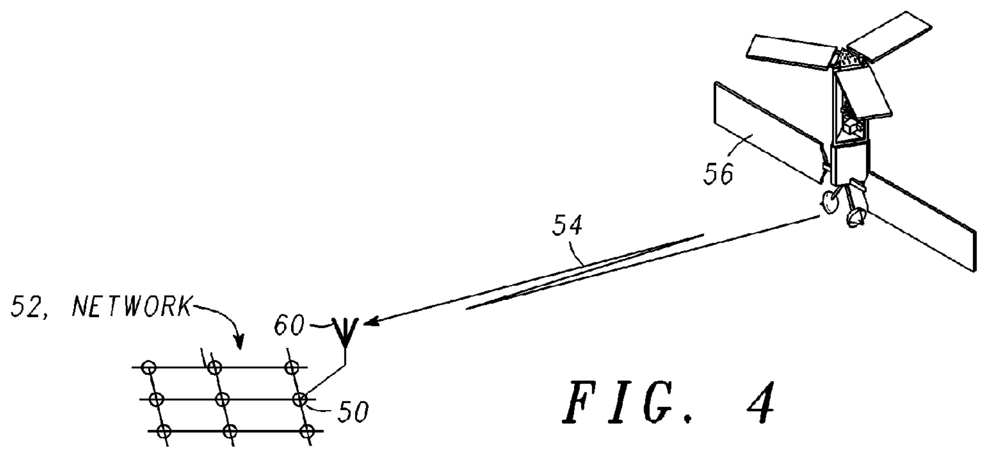
FIG. 4 is a schematic representation of a switch fabric forming a portion of a vehicle network incorporating synchronization.

In another alternative arrangement illustrated in FIG. 4, one or more, but less than all of the elements of a switch fabric 52 are adapted to receive a timing signal 54 from an external source 56. As shown in FIG. 4, the network node 58 is coupled to an antenna 60 and is adapted to receive the timing signal 56. The node 58 determines the time reference and then communicates it to other elements in the network, such as node 64. The time reference may be substantially simultaneously communicated to all network elements, device and interfaces by use of a medium external to the network itself, such as the power feeds. Of course, the network itself may be used to communicate the time reference by taking into account path delays, and the like.

Timing information within nodes coupled to the network may degrade, e.g., wander or drift as the result of clock skew. In that event, the time synchronization element, whether standalone or incorporated within a network node, device or interface, may periodically cause the nodes on the network to become resynchronized. For example, a signal may be sent via the power feeds or a signal may be received from an external source and used to refresh the timing information.

Figure 5:
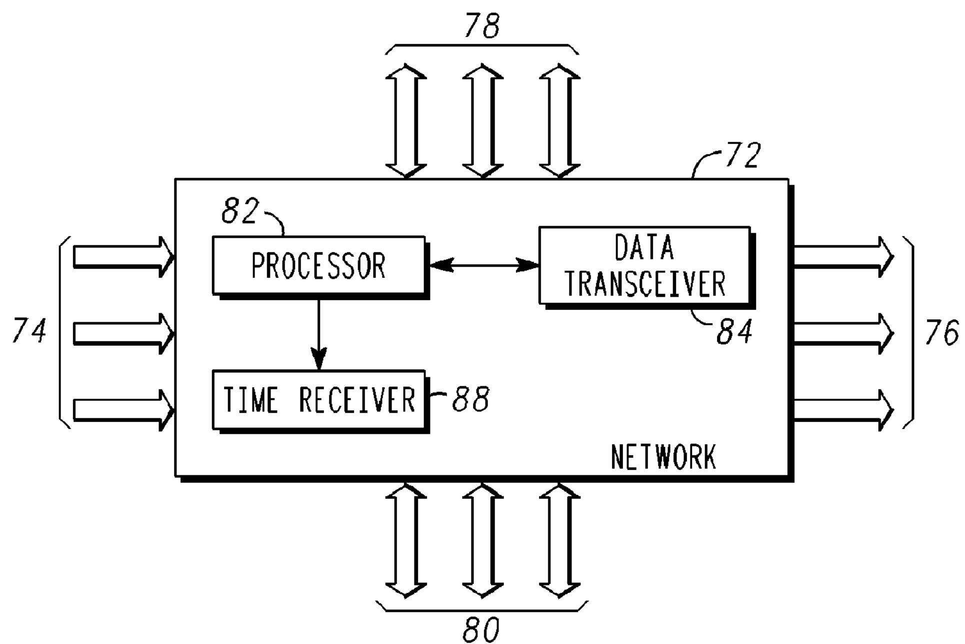
FIG. 5 is a block diagram of a switch that may be used in the networks shown in FIGS. 3 and 4.

FIG. 5 illustrates an active element 72 that may be used in connection with the vehicle networks described herein. To illustrate the functionality and the adaptability of the active element 72, it is shown to include a plurality of input ports 74, output ports 76 and input/output ports 78 and 80. Various configurations of the active element 72 having more or fewer ports may be used in an active network depending on the application. The active element 72 may further include a processor 82 that may include an internal memory or may be coupled to a memory (not depicted). The processor 82 includes a suitable control program for effecting the operation of the active element 72 for coupling inputs to outputs in order to transmit data within the network.

The active element 72 includes a time receiver 88 coupled to the processor 82. The time receiver 88 is adapted to receive the periodic time signal, such as the power feed signal or a signal communicated wirelessly, and to communicate the time signal to the processor 82 which then adjusts its internal time reference, i.e., its internal clock, accordingly.

Additionally, the active element 72 may include a data transceiver 84 controlling the transmission of data to other elements within the network and to other networks, for example networks located in nearby vehicles. The data transceiver may therefore include an RF transceiver for wirelessly communicating data to the other networks. In that case, the data transceiver 84 may be used to receive time signals that are wirelessly transmitted. The active element 72 may be an assembly of circuit components or may be formed as a single integrated circuit device.

Figure 6:
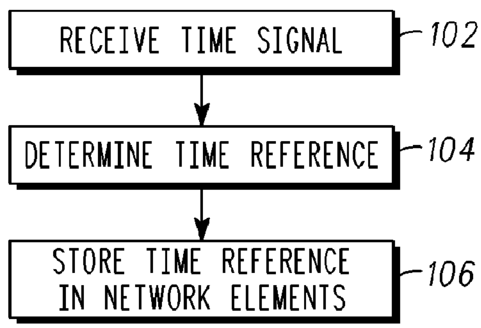
FIG. 6 is a flow chart depicting a method of synchronizing an in-vehicle network.

Referring now to FIG. 6, a method 100 of synchronizing elements of an in-vehicle network includes the step of receiving a time signal from a source external to the network, 102. An absolute time reference is determined from the received time signal, 104. Then, the time reference is stored within the elements of the in-vehicle network or used to update an internal clock, 106. On the next periodic update, the process is repeated to maintain the time synchronization of the network.

The time signal may be received at a single element of the network and propagated to the other elements of the network. Timing synchronization may be maintained because the delay associated with propagating the signal through the network may be determined, and the time signal adjusted accordingly at each network element. The time signal may also be received at all of the network elements, which would then process the time signal to determine the time reference. In a still further alternative, the time signal is received by several network elements, which then propagate the signal throughout the network. An identifier may be associated with the time signal so that if an element receives the time signal from multiple sources, it will know if it has the latest time reference.

Other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

I claim:

1. A vehicle network comprising:

a plurality of network elements joined by communication links for a transmission of data there between;

each network element of the vehicle network including a local clock, a processor, and a memory, the memory adapted for storing and retaining an updatable time reference;

a receiver disposed within each network element, the receiver for receiving a time reference signal from a time source within a vehicle and external to a node carried by a medium independent of the communication links and for communicating an absolute time reference signal to the processor; and the processor being operated upon receipt of the absolute time reference signal to update the absolute time reference stored within the memory, wherein each network element is couple to a power distribution feed, and wherein the updatable time reference is substantially simultaneously communicated via the power distribution feed to each network element.

2. The vehicle network of claim 1, wherein the time reference comprises an alteration of a characteristic of the power delivered via the power distribution feed.

3. The vehicle network of claim 1, wherein the medium comprises one of radio frequency, optical, and haptic transmission.

4. The vehicle network of claim 1, wherein the external time source comprises a Global Positioning System (GPS) receiver coupled to the node for receiving a GPS time reference signal.

5. The vehicle network of claim 1, wherein the external time source comprises a time reference signal receiver coupled to the node for receiving the time reference signal.

6. The vehicle network of claim 1, wherein the external time source comprises a cellular telephone receiver for receiving the time reference signal from a cellular telephone base station.

7. The vehicle network of claim 1, wherein the network comprises a switch fabric.

8. A vehicle network comprising:

a plurality of network elements joined by communication links for a transmission there between of data packets;

each network element of the vehicle network including a local clock, a processor and a memory, the memory for storing and retaining an updatable absolute time reference;

a receiver coupled to the network at one of the network elements, the receiver for receiving an absolute time reference signal from a time reference source external to a vehicle and for communicating the absolute time reference signal to the processor of the coupled network element;

the processor being operated upon receipt of the absolute time reference signal to update the absolute time reference stored within the memory of the network element and to communicate a time reference signal to each of the remaining network elements of the network; and the processors of the remaining network elements of the network being operated upon receipt of the absolute time reference signal to update the absolute time reference stored within the memory of the network element, wherein the absolute time reference comprises an alteration of a characteristic of a power delivered via the power distribution feed.

9. The vehicle network of claim 8, wherein each network element is coupled to the power distribution feed, and wherein the updatable absolute time reference is substantially simultaneously communicated via the power distribution feed to each network element.

10. The vehicle network of claim 8, wherein the receiver comprises a Global Positioning System (GPS) receiver for receiving a GPS time reference signal, the absolute time reference signal being based upon the GPS time reference signal.

11. The vehicle network of claim 8, wherein the receiver comprises a cellular telephone receiver for receiving a cellular telephone base station time reference signal, the absolute time reference signal being based upon the cellular telephone base station time reference signal.

12. The vehicle network of claim 8, wherein the network comprises a switch fabric.

13. In an in-vehicle network having a plurality of network elements joined by communication links for a transmission of data packets there between, a method of time synchronizing the network elements comprising the steps of:

receiving a time signal from a time signal source external to the network;

determining an absolute time reference from the time signal; and updating a time reference stored in each of the network elements based upon the absolute time reference, wherein the step of receiving a time signal from a time signal source comprises receiving via a power distribution feed at each network element a time signal form a time signal source.

14. The method of claim 13, wherein the step of receiving a time signal from a time signal source comprises receiving at each network element a time signal from a time signal source.

15. The method of claim 13, wherein the step of receiving a time signal from a time signal source comprises receiving at a network element of the plurality of network elements a time signal from a time signal source; and wherein the step of updating a time reference stored in each of the network elements based upon the time signal comprises communicating the time reference to the plurality of network elements.

16. The method of claim 15, wherein the step of receiving a time signal comprises receiving an absolute time signal.

17. The method of claim 15, wherein the step of receiving a time signal comprises receiving a time signal from a source external to the vehicle.

18. The method of claim 13, wherein the step of receiving a time signal from a time signal source comprises receiving at least one of a global positioning system (GPS) time signal and a cellular base station time signal.

* * * * *